United States Patent [19]

Seguin et al.

[11] Patent Number: 5,107,510
[45] Date of Patent: Apr. 21, 1992

[54] APPARATUS AND METHOD FOR BURST-MODE OPERATION OF A PULSED LASER

[76] Inventors: Herb J. J. Seguin, 12639 -52 Avenue; Suwas K. Nikumb, 101 - 11510 - 40 Avenue, both of Edmonton, Canada

[21] Appl. No.: 414,472

[22] Filed: Sep. 29, 1989

[51] Int. Cl.$^5$ ............................................. H01S 3/10
[52] U.S. Cl. ............................................. 372/25; 372/76
[58] Field of Search ....................... 372/55, 85, 86, 87, 372/76, 57, 83

[56] References Cited

U.S. PATENT DOCUMENTS

| | | | |
|---|---|---|---|
| 4,288,758 | 9/1981 | Seguin et al. | 378/55 |
| 4,498,183 | 2/1985 | Lavatter | 372/86 |
| 4,574,380 | 3/1986 | Nam | 372/55 |

*Primary Examiner*—Léon Scott, Jr.
*Attorney, Agent, or Firm*—Anthony R. Lambert

[57] ABSTRACT

Apparatus and method of providing for the excitation of a pulsed laser in which the pulsed excitation energy is provided to the laser plasma volume in a series of bursts, each burst being characterized by containing sufficient pulses to sustain the laser pumping current and by being separated from the previous bursts by sufficient time for the laser plasma to recombine. Application of the burst mode enhancement technique is described with reference to a PIE or photo-initiated, inpulse-enhanced, electrically excited plasma excitation process.

8 Claims, 7 Drawing Sheets

APPARATUS AND METHOD FOR BURST-MODE OPERATION OF A PULSED LASER

FIELD OF THE INVENTION

This invention relates to a method and the operation of a high powered laser, and particularly to a method and apparatus for the power enhancement of a pulse excited laser.

BACKGROUND OF THE INVENTION

Increasing the average power of lasers is desirable for many industrial applications such as welding and cutting. However, while it has been possible to develop lasers with high peak power in the mega-watt range and higher (see, for example, A. F. Gibson and M. H. Key, High Power Lasers, Rep. Prog Phys , Volume 43, 1980), instability in the laser plasma has prevented maintenance of the high power so that average powers are typically in the single digit kilowatt range.

In order to obtain the higher peak intensities required for "thicker section" processing, lasers have often been operated in a repetitively pulsed manner. However, to be commercially viable in a typical commercial application, such a pulse machine must also possess a high production capability. Consequently, the ability to provide pulse as well as CW radiation, while still retaining high average power output, is becoming an increasingly important requirement in high powered industrial laser systems.

In low or medium powered lasers, pulse performance is normally accomplished through the utilization of a suitable switch to "chop" the dc electrical supply to the device. Operating a $CO_2$ gas discharge in this manner has yielded output power levels 2 or 3 times higher than that attainable under regular CW conditions.

Such pulse lasers are known in the art, as described, for example, by James P. Reilly, Pulser/Sustainer Electric-discharge Laser, J. Appl. Phys., Volume 43, No. 8, Aug. 1972; Alan E. Hill, Continuous Uniform Excitation of Medium Pressure $CO_2$ Laser Plasmas by means of Controlled Avalanche Ionization, Appl. Phys. Lett., Volume 22, No. 12, June 15, 1973; and Sequin et al, U.S. Pat. No. 4,288,758, issued Sept. 8, 1981 (describing an earlier invention by one of the inventors of the present invention).

Pulsed operation of most kilowatt lasers, however, is not practical. This is mainly because long life, high average power, switching devices, capable of handling the enormous pulse excitation energies associated with these large volume machines, are not available.

To overcome these disadvantages, the inventors have developed a completely different discharge switching technique known as burst mode operation to provide long term pulsed operation of a high powered laser. As particularly described here, the burst mode operation has been applied to a multi-kilowatt, photo-initiated, impulse-enhanced, electrically excited $CO_2$ system (hereinafter PIE laser).

SUMMARY OF THE INVENTION

The principal feature that characterizes the burst mode pulse discharge technique is the operation of the pulser laser, such as the PIE ionization pulser, in a repetitively on-off manner, so as to generate short intervals or "bursts" of gain plasma within the optical resonator's mode volume. This burst-mode status is realized through modulation of the ionization pulser's free running trigger circuit, with an appropriate control signal. Thus, a low level gating wave form permits selection of the number of individual ionization pulses contained in a particular burst, as well as the burst repetition rate.

In this manner, the mode volume is ionized and vibrationally pumped at repetitively short intervals, correspondening to the burst's repetition rate and length. The ability to vary the number of ionization impulses in a burst provides an additional means for controlling plasma density and the concomitant E/N ratio for efficient vibrational pumping.

Thus, in one aspect, the invention provides a method of exciting a laser in which excitation energy is applied to the laser in pulses, the method comprising applying the pulses to the laser plasma in a series of bursts, each burst characterized by containing sufficient pulses to sustain the laser pumping current and by being separated from the previous burst by sufficient time for the laser volume to relax.

In another aspect, the present invention provides an apparatus for controlling the excitation of a laser plasma comprising: pulsed ionization means for providing pulsed excitation energy to the plasma; and switch means for repetitively switching the pulsed ionization means on and off.

BRIEF DESCRIPTION OF THE DRAWINGS

There will now be described a preferred embodiment of the invention by way of example with reference to the drawings in which.

DESCRIPTION OF A PREFERRED EMBODIMENT

This invention concerns the manner of operation of a laser, and this description describes how the laser is operated. The inventors make no claim to the actual laser itself, apart from an apparatus, described below, for providing the burst mode operation of the laser. Consequently, the laser itself is not described in detail here. The burst mode operation of a laser is predicted by the inventors to work with any type of pulse-sustained laser, for example, the pulser/sustainer, electric-discharge laser or the pulsed RF excited laser. What is described here is the successful operation of the method with the PIE laser, by way of example. It is predicted by the inventors that the operation of the burst mode method will be less successful, though still advantageous, when used with other pulse lasers such as electric discharge or RF lasers.

Furthermore, the PIE laser and its construction are well known in the art, and for this and the reason set out above, is not described in detail here. However, a detailed description of the operation of the PIE laser may be found in the following references: H. J. J. Seguin, K. H. Nam, J. Dow and V. Seguin, "Crossed-tube Fluid-ballasted Electrode Pair for EDL Applications," Appl. Optics, Volume 20, pages 2233-2238, 1931; H. J. J. Seguin, J. Dow and V. A. Seguin, "Simple and Economic Compressors for Large Volume Gas Transport Laser System," Rev. Sci. Instrum., Volume 54, pages 1338-1345, 1983; V. E. Merchant, H. J. J. Seguin and J. Dow, "Novel Transformer Designs for High Power High Repetition Rate Applications," Rev. Sci. Instrum., Volume 50, pages 1151-1153, 1979 and H. J. J. Seguin, K. H. Nam and J. Tulip, "An Efficient Multi-Element Cathode for High Power Electrical Discharge Laser Applications," J. Appl. Phys., Volume 49, pages 4566-4567, 1978.

Figure 1:
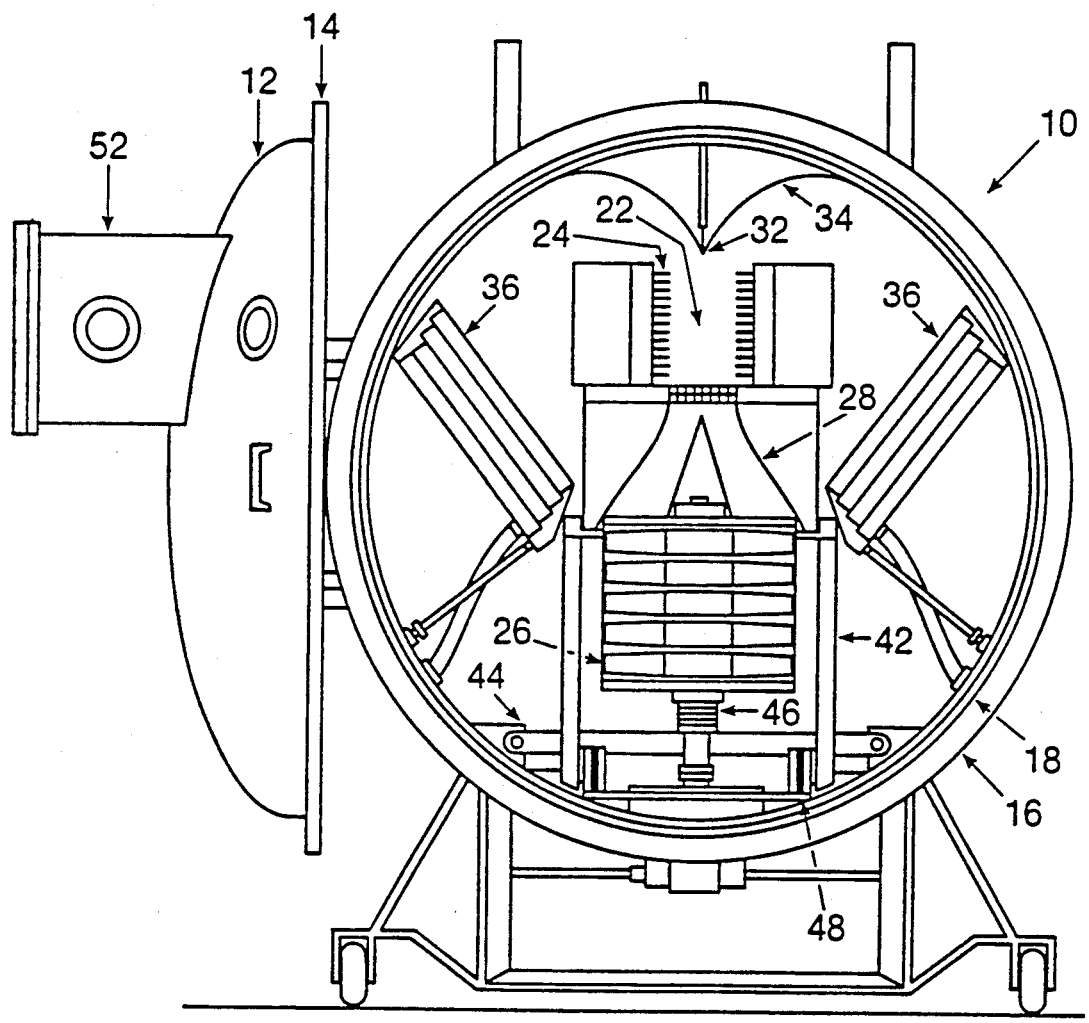
FIG. 1 is a schematic diagram of a prior art PIE laser construction.

A brief discussion of a PIE laser will follow with reference to FIG. 1. The PIE laser, shown generally at 10. is housed in a cylindrical housing with hinged door 12 having flange 14 which mates with a complementary flange 16 on the cylindrical housing. O-ring vacuum seal 18 provides for a tight seal between the two flanges 14 and 16. The lasing volume is shown at 22 between a double set of fluid-ballasted multi-element electrodes 24. The gas to be ionized in the plasma volume 22 is blown through the plasma volume 22 by axial flow compressor 26. The flow of gas passes through the transition zone 28 into the plasma volume 22 and then is split by the ceramic flow splitter 32 and directed by flow ducting 34 through the heat exchangers 36 and back to the axial flow compressors 26. The axial flow compressors 26 are mounted on chassis 42 through chassis tie pins 44. The compressors 26 are driven by a belt drive 46, and may be removed from the cylindrical housing on roll out track 48.

The laser beam is extracted from the plasma volume 22 through a folded optical extraction system located at 52. Gas flow, discharge electric field, and optic axis are mutually orthogonal.

The multi-element electrode geometry for the design of both the anode and cathode structures of the fluid-ballasted p-i-n electrode structure 24 provides improved plasma homogeneity, with concomitant enhanced gain uniformity, because of the inherent current distributive nature of the geometry. The individual electrode modules of the electrode structure 24 are composed of about 200 equally spaced stainless steel sub-electrode elements, each with an individual fluid-ballasted resistance (not shown) in series.

The discharge channel length, along the optical axis, was 3 m with an inter-electrode spacing of some 90 mm. The height of the gain media, in the direction of gas transport, was about 180 mm, thereby providing a total excited channel volume of about 40 l. The continuously variable gas transport subsystem for this laser could provide flow velocities up to 75 m per second, although flow velocities of about 50 m per second were found to give adequate results.

The optical extraction system shown generally at 52 is well known in the art, and will not be described in further detail here.

Figure 2:
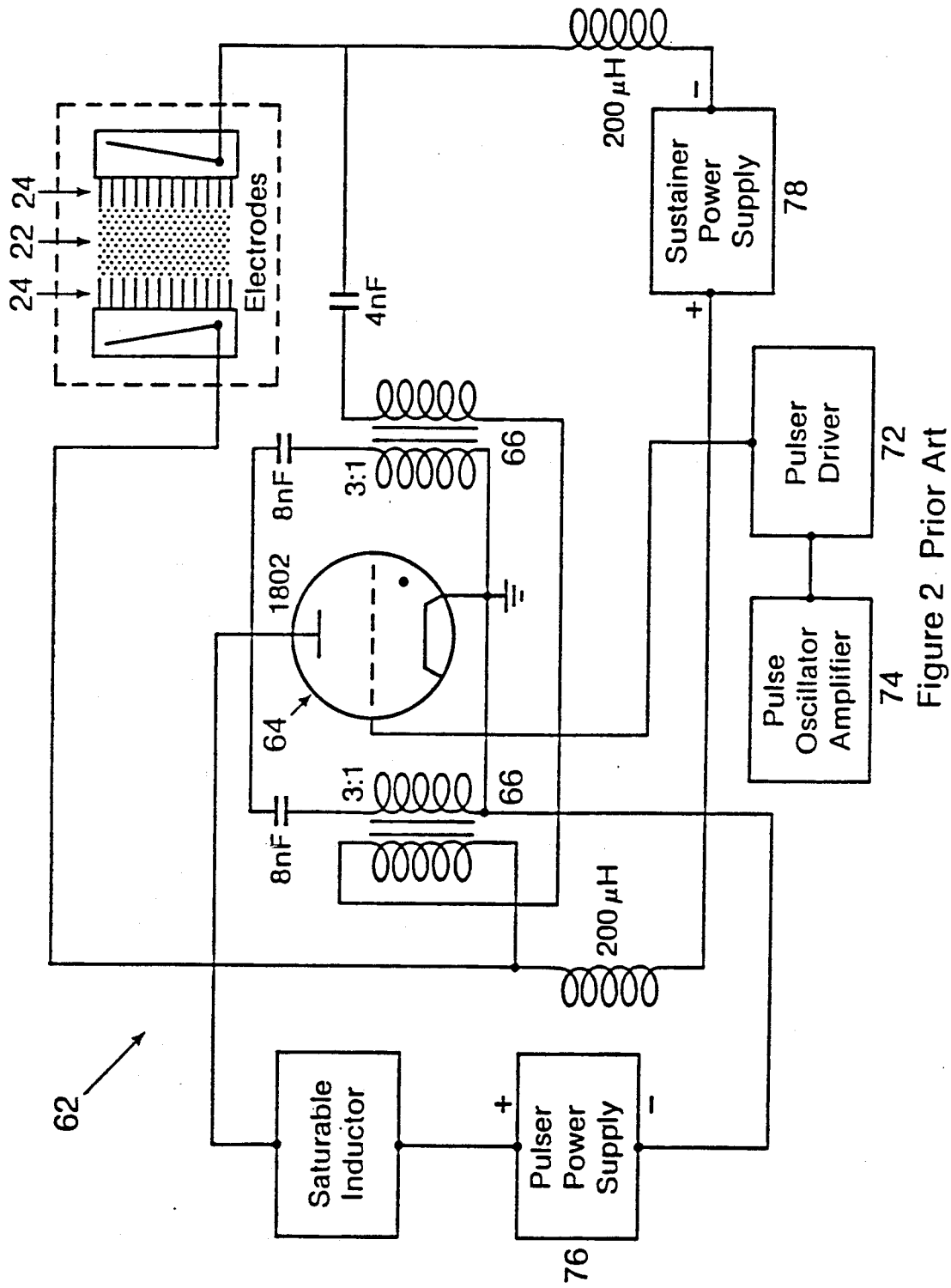
FIG. 2 is an electrical schematic of a prior art PIE excitation system.

The PIE's process involves the generation of a continuous gaseous gain media, by means of the controlled and sequential application of a series of photo-ionization and avalanching electrical impulses. The repetition rate of the pulser for the PIE process is chosen to be significantly greater than the characteristic plasma relaxation time, typically around 5 kHz in the present instance. Thus, although the ionization process is of a pulsed nature, the resulting laser plasma can nevertheless be run in a continuous or dc mode. The sequential process of photo and impulse ionization is extremely fast, and follows the rise time of the avalanching wave form. Thus, only minimal duration impulses are required. The overall electrical schematic of the excitation system developed for the PIE device is represented in FIG. 2. The pulser unit shown generally at 62 includes a hydrogen thyratron 64 as the switching element for simultaneously driving both of the fluid-ballasted electrode structures 24. An 1802 EG&G hydrogen thyratron has been found to function adequately as the switching element at frequencies up to 10 kHz and charging voltages up to 5 kV. Two 3:1 impulse transformers 66 were used to step up the thyratron 64 output up to the dual polarity level required for driving the anode and cathode structures. Typical impulse voltages may be plus or minus 10 kV. The pulser unit 62 is immersed in oil to both cool and insulate the thyratron and other high voltage circuit components. Thyratron 64 output is controlled by pulser driver 72 fed by pulse oscillator amplifier 74 and is powered through the pulser power supply 76. The power supply for the fluid-ballasted electrodes 24 is shown at 78. Further details of this prior art construction may be found in V. E. Merchant, H. J. J. Seguin and J. Dowe, "High Power High Repetition Rate Pulser for Photo-Impulse Ionized Lasers," Rev. Sci. Instrum., Volume 49, pages 1631-1636, 1978.

The essential principle of the burst mode pulsed discharge is based on operating the PIE high-frequency ionization pulser in a repetitive manner, but only for very short time intervals or bursts. The utilization of such a procedure was made possible by the important consideration that the laser plasma could be operated under nonself-sustained conditions, up to the highest pumping current levels of interest.

The time interval between bursts is determined by the relaxation time of the plasma, a concept which is well understood in the art. The relaxation time is the time during which instabilities are removed from the plasma volume.

Figure 3:
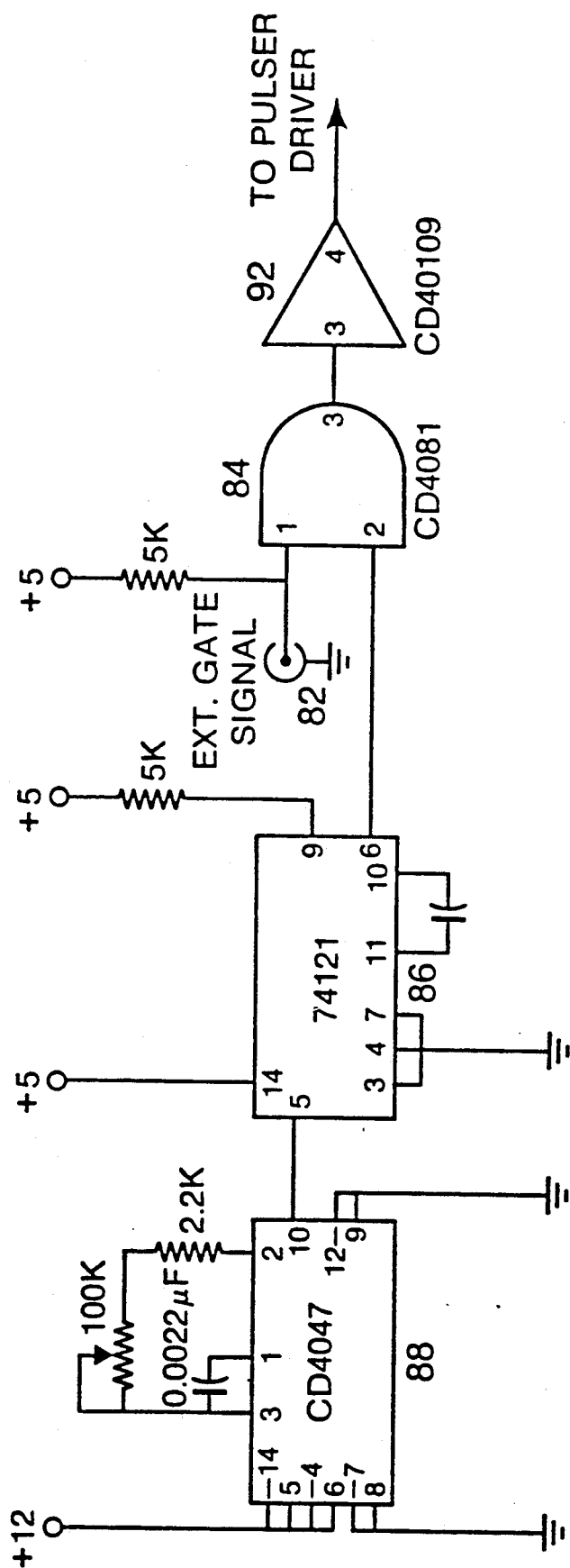
FIG. 3 is an electrical diagram of a trigger circuit according to the invention for the pulser of FIG. 2.

Burst mode pulsed excitation for the PIE laser is achieved by introducing an external gating signal into the main trigger circuit of the pulser unit 62, as shown in FIG. 3. The continuous pulsed train is produced using a general purpose, low level, laboratory function generator (for example, as in this case, B. K. Precision Ltd. Model No. 3020), with independent frequency and pulse width controls. The external gating signal was introduced to the trigger circuit at 82. The signal was used to turn on and off the normally free-running 5 kHz thyratron trigger generator (for example, in this case, Plasma Kinetic Inc., Model 121). Provision is made in the circuit to count and control the number of thyratron trigger pulses that may be generated during a particular on sequence. As shown in FIG. 3, gate 84 (for example IC model number CD4081), is used to combine the external gate signal from 82 with the 5 kHz signal from the thyratron trigger generator 86. The pulse generating circuit is shown at 88 (for example IC model number CD 4047), and the resulting burst mode pulse train is provided to the pulser driver through amplifier 92 (for example IC model number CD 40109).

In this manner, the high voltage PIE ionization pulser may be made to produce a pre-selected number (burst) of 5 kHz output impulses, at an adjustable recurrence rate (burst repetition frequency), as set by the gating generator frequency. The ability to control the number of ionization impulses that will be produced in a particular burst is of considerable benefit since it provides an easy method of controlling the ultimate E/N ratio of a discharge. In operation, the inter-electrode volume is repetitively ionized and vibrationally pumped, but only for the duration of each specific burst. In the absence of a burst, no discharge remains in the channel, despite the fact that the main dc supply voltage remains impressed across the electrodes. The inter-burst extinction of the laser plasma is achieved by virtue of its nonself-sustained character.

For the experiments reported in the following section, the pulser frequency was held constant at 5 kHz, while the burst repetition rate was varied up to 600 bursts per second. The number of individual photo and avalanching impulses contained in a particular burst was set at 7. The number and frequency of the impulses in a particular burst must be sufficient to sustain the plasma excitation. It is desirable that the number of pulses provide an adequate number of sequential ionization events to provide a quasi-steady state plasma density within the discharge.

Although the individual ionization impulses applied to the electrodes 24 during a burst were only about 50 ns in duration, the corresponding duration of the resulting laser plasma pumping pulse was considerably longer, being about 30 microseconds. Under these conditions, the effective active media pumping period, during a single burst, is about 1.2 ms, as shown in FIG. 10.

Figure 10:
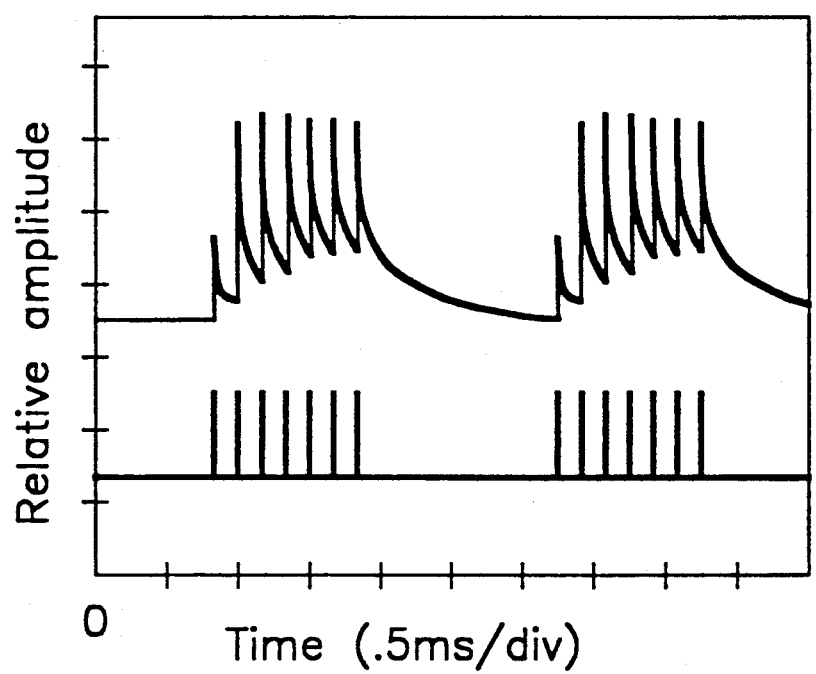
FIG. 10 is an oscilloscope trace showing the discharge performance of a burst mode pulser laser according to the invention.

In FIG. 10, is shown on oscilloscope trace of discharge performance. The lower trace shows the ionization impulse burst and the upper trace shows the dc pumping current spikes. The gap between the pumping current bursts shows the relaxation of the plasma, essentially to zero.

The unusual pumping current time dependence reflects the fact that the plasma was nonself-sustained and that the burst generated ionization persisted within the inter-electrode region, until such time as it was blown away by the gas transport effects. Satisfactory operation of this laser has been obtained up to 800 Hz, although it is predicted that burst mode operation may be obtained well into the kHz range upon shortening the effective burst width or providing more rapid gas transport, so that the residual pulser ionization is fully extinguished between individual bursts. If this is not done, then the discharge runs in a less efficient, low level CW manner, on the remnant inter-burst ionization.

LASER POWER MEASUREMENTS

Figure 4:
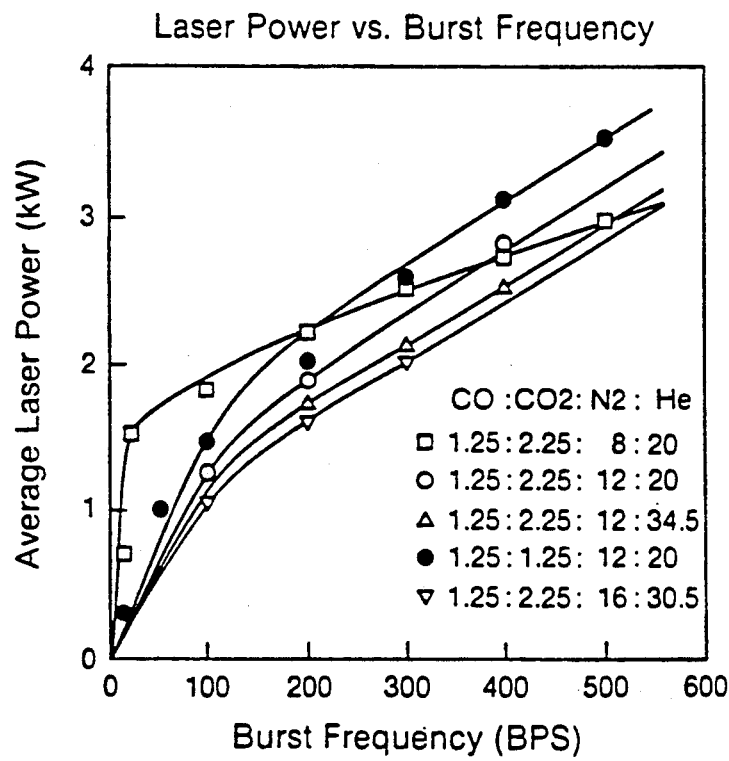
FIG. 4 is a graph showing laser power versus burst frequency for a laser operating according to the invention.

The dependence of the average laser output power, as a function of a number of operational parameters, was studied in detail. The effects of gas mixture, pressure, average pumping current, pulser ionization level, burst frequency, and the number of individual pulses per burst, on overall laser performance are illustrated in FIGS. 4 through to 9.

A standard concave-convex stable resonator configuration was utilized during these particular optical power output tests. The water-cooled, cavity mirrors were fabricated from a diamond machined aluminium alloy. Additional design considerations for this all-metal optical extraction system are presented in Z. Cheng, H. J. J. Seguin, S. K. Nikumb, V. A. Seguin, and H. Reshef, "Annular-coupled concave-convex stable resonator for large volume high quality energy extraction," Appl. Opt., Volume 27, pages 836–842 1988. The laser power data were recorded with a 10 kW power probe (Optical Engineering Model-P10K). Unless otherwise specified, all data presented were collected at a constant dc input current of 25 A and a gas transport velocity of 50 m/s.

LASER POWER VERSUS GAS MIXTURE

In this test both the pulser frequency and the number of individual ionization impulses per burst were kept constant at 5 kHz and 7, respectively. Optical output power was then recorded, while varying the burst repetition rate. The measurement sequence was repeated for a number of different gas mixtures. Results are depicted in FIG. 4. It is seen that average laser power initially increases rapidly, as a function of the burst repetition rate, up to about 100 bursts/s. Beyond this point the response becomes linear for each of the several gas mixtures investigated. Best performance was achieved for a mixture of $CO:Co_2:N_2:He$ corresponding to 1.25:1.25:12:20 Torr, up to a burst repetition rate of about 500 Hz.

Although a near 100 percent increase in the $CO_2$ concentration of the mixture improved the laser's performance at low burst repetition rates, it ultimately yielded a 20 percent reduction in maximum power output. A 30 percent increase in the nitrogen constituent was observed to exhibit a similar degenerative influence on performance. Both of these effects were due to reduction in the maximum achievable electrical power loading before the onset of a glow-to-arc transition. The inclusion of too much He into the lasing mixture also resulted in poorer performance, due to a less effective vibrational pumping E/N ratio within the plasma.

LASER POWER VERSUS PULSER POWER

Figure 5:
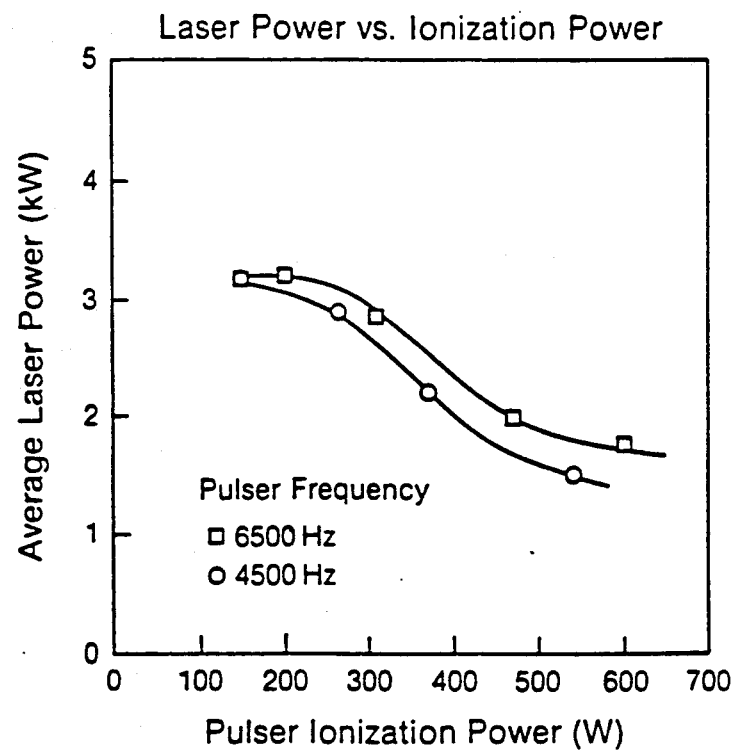
FIG. 5 is a graph showing laser power versus ionization power for a laser operating according to the invention.

Results on the variation of the average power performance of the laser, with respect to the ionization power deposited by the pulser, are depicted in FIG. 5. A dc pumping current of 25 A was used during these measurements, while the burst repetition rate was held constant at 500 bursts/s. The burst width (a function of the number of pulses in each burst and the pulser running frequency) was adjusted to be 1.5 ms. This was accomplished by setting the number of pulses per burst to be either 6 or 10 for the respective pulser frequencies of 4.5 and 6.5 kHz. The previously determined optimum gas mixture of $CO:CO_2:N_2:He$ in the ratio of 1.25:1.25:12:20 was also chosen for this test.

On start up the laser was first operated in a normal CW mode, in order to facilitate setting the average dc pumping current to 25 A, and then switched into the pulsed burst-mode for collecting the optical output data. During these tests a peculiar dependence of laser performance on pulser energy was noted. A distinct optimum near 220 W of deposited ionization power was observed. These findings were consistent with previously reported data on gain measurements. As such, the results served to further document the fact that only a very small quantity of external ionization energy is required to sustain a PIE discharge, be it either in a CW or pulsed mode of operation.

LASER POWER VERSUS NUMBER OF PULSES PER BURST

Figure 6:
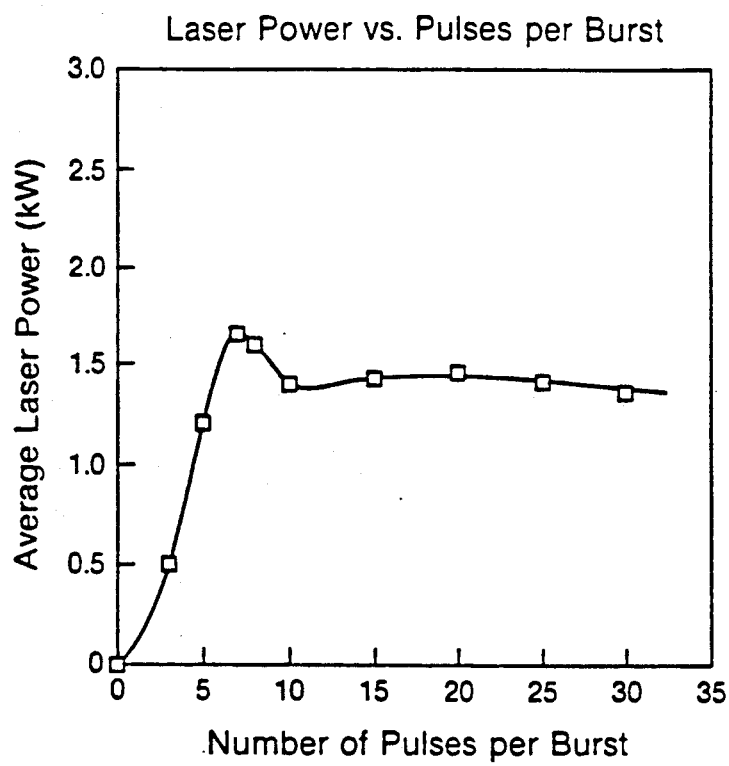
FIG. 6 is a graph showing laser power versus pulses per burst for a laser operating according to the invention.

FIG. 6 reveals the nature of the average laser output power variation, as a function of the number of individual pulses in each burst. In this test, performed in an optimum gas mixture, the pulser was operated at a fixed pulser frequency of 5 kHz and a constant burst repetition rate of 100 bursts/s. The average dc pumping current was held at 12.5 A, which corresponded to a normal CW current of near 25 A.

The figure reveals an initial rise in optical power extraction as the burst width is increased. A fairly distinct maximum is reached at about seven or eight pulses in each burst. Beyond this number, laser performance is seen to saturate at a somewhat lower output level. The shape of this curve bears a striking resemblance to the envelope of the individual current spikes in a particular burst. Consequently, the optimum conditions depicted in FIG. 5 are believed to reflect the current regulation of the pumping dc power supply.

Irrespective of these considerations, however, the data of FIG. 6 show that only a small number of pulses are actually needed to establish the ionization level required to sustain the laser's pumping current. Under these operational conditions a "fixed duration" current spike accompanied each individual ionization pulse. Thus, the number of pulses contained in a single burst controlled the maximum burst repetition rate that could be achieved, without the laser discharge advancing into the normal CW mode.

LASER POWER VERSUS PULSER FREQUENCY

Figure 7:
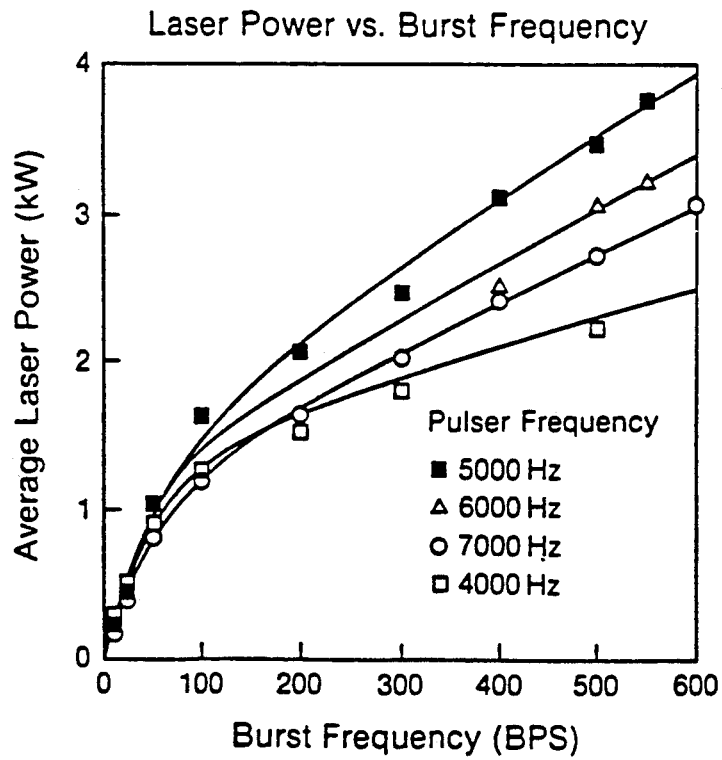
FIG. 7 is a graph showing laser power versus burst frequency for a laser operating according to the invention.

Laser power extraction, as a function of the burst repetition rate, at different pulser frequencies, was also investigated. The results are plotted in FIG. 7. In this instance also, observations were made with an optimum gas mixture, an equivalent dc pumping current of 25 A, and seven ionizing pulses per burst. From FIG. 7 it would appear that the laser performs quite similarly over a wide variation in pulser frequency. A broad optimum performance range is observed centered near 5 kHz; however, a substantial drop off occurs below 4 kHz and above 7 kHz.

Figure 8:
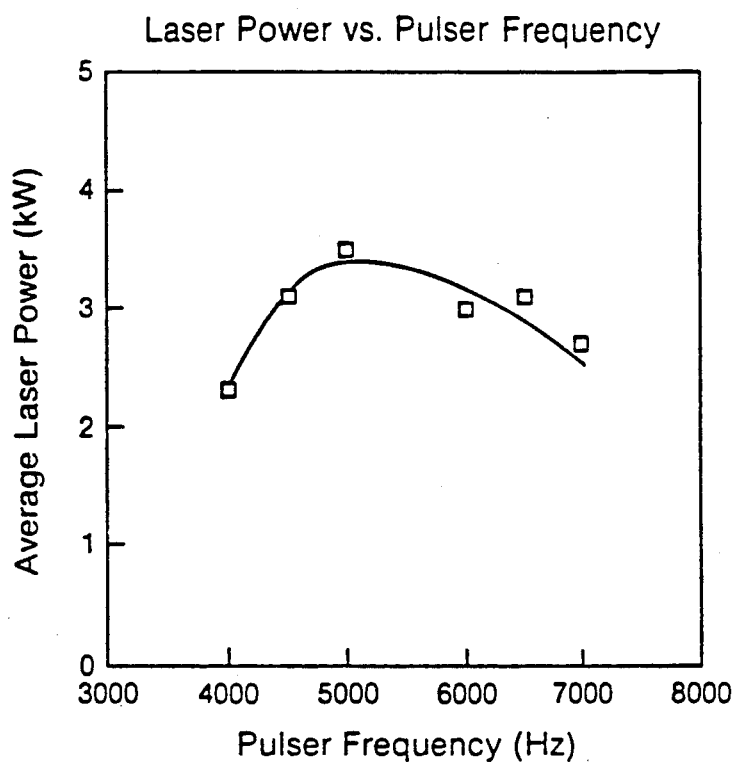
FIG. 8 is a graph showing laser power versus pulser frequency for a laser operating according to the invention.

Additional confirmation of these operational parameters was obtained in another experiment illustrated in FIG. 8. Here the burst repetition rate and width were held constant at 500 bursts/s and 1.5 ms, respectively, while the pulser frequency was varied. Best performance was again obtained near the 5 kHz point, further attesting to the existence of an optimum pulser frequency for this burst pulsed discharge mode.

LASER POWER VERSUS dc PUMPING CURRENT

Figure 9:
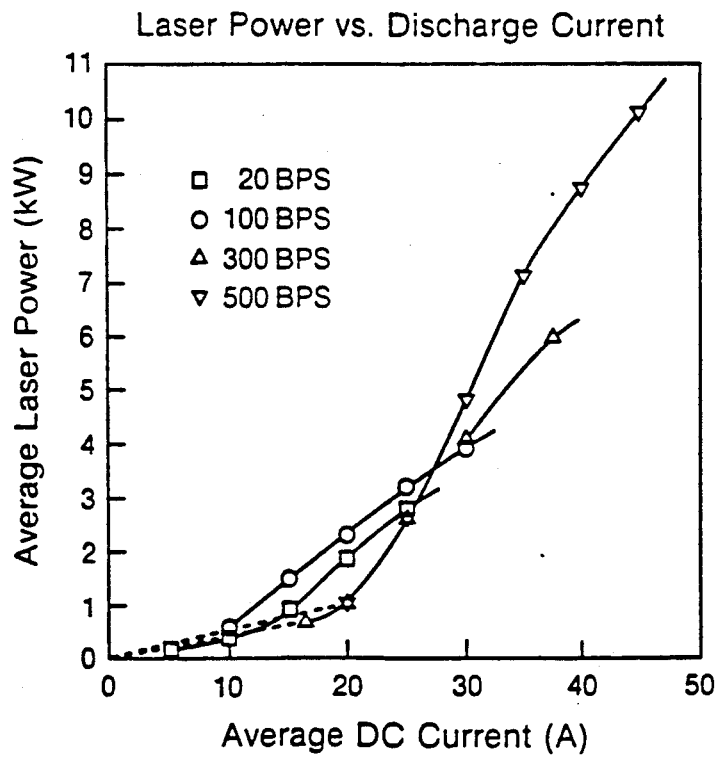
FIG. 9 is a graph showing laser power versus discharge current for laser operation according to the invention.

Finally, FIG. 9 depicts the influence of the burst repetition rate on the laser's average output Power, measured with respect to its average input electrical discharge current. In these tests the pulser frequency, ionization power, and burst width, were kept constant at 5 kHz, 220 W, and 1.2 ms, respectively.

A number of interesting observations were made during data collection. Firstly, the lasing threshold appeared to increase with the burst repetition rate. In particular, a significantly lower threshold of 5 A was observed when the burst rate was 20 bursts/s, as compared to that of 20 A obtained at 500 bursts/s. Also at pumping levels below 10 A a variation in the burst repetition rate of over an order of magnitude had negligible effect on the laser power produced. However, at high pumping levels, above 25 A, an increase in the burst repetition rate was indeed reflected in a substantial improvement in optical energy extraction.

Surprisingly there appears to be a reversal of this general trend at intermediate pumping currents (i.e. 10–25 A), such that the laser power was observed to drop by over 50 percent at 20 A discharge current, when the burst repetition rate was increased from 100 to 300 Hz. Irrespective of these anomalies, however, the average optical power was seen to be an increasing function of the average discharge current under all conditions. Significant regions of linearity were revealed at higher current levels.

At lower burst repetition rates, it was observed that the discharge operated satisfactorily for input currents up to about 25 A. Plasma pumping beyond this level was invariably accompanied by the onset of discharge instabilities, with subsequent detrimental effects on the laser's optical performance. However, such was not the case at higher burst rates, particularly beyond 100 bursts/s.

It is evident from FIG. 9 that an average optical output power of 10 kW was achieved at a repetition rate of 500 bursts/s. This result was obtained at an average discharge current of about 45 A, and without the appearance of any electro-thermal instabilities. No attempts at higher power operation were made because of concern over possible failure of the previously degraded ZnSe output window.

BURST REPETITION RATE LIMITATIONS

The initial limitation to the burst repetition rate stemmed from considerations of overlapping between the ionization tail of a previous burst sequence and the onset of a succeeding one. Such a condition invariably resulted in CW rather than pulsed operation. Consequently, efforts were made to shorten the individual ionization impulses, so that a higher burst repetition rate could be achieved. Pulse length shortening was attempted by running the pulser at a much higher frequency, typically at about 11 kHz, but with a reduced energy per pulse.

Results documented that indeed it was possible to operate the laser at burst repetition rates up to 800 bursts/s, using a burst width reduced to about 0.72 ms. With these parameters, and again using seven ionization spikes in each burst, the total dc pulser input increased to near 700 W.

The present method and apparatus are primarily designed for photo-initiated laser ionization systems, but are predicted to be also useful in other laser ionization systems, such as the pulser/sustainer electric discharge laser and the RF excited laser. However, in both cases, it is expected that the advantages of the burst mode system will be reduced. This is because the tendency in an RF excited or a purely electrically (DC) excited system is for the plasma to "remember" the previous discharge, so that on each successive discharge the plasma volume tends towards instability, the discharge following the previous discharge pattern. By contrast, in a photo-initiated ionization system, the excitation energy is not constrained to follow the electrical field geometry of the previous burst, but diffuses more uniformly throughout the laser volume. Thus, for the photoinitiated discharge, the laser volume tends towards greater stability, and, as it is known in the art, thus provides greater average power.

It will be understood that immaterial modifications may be made to the invention by persons skilled in the art, and these are intended to be covered by the scope of the claims that follow.

We claim:

1. A method of exciting a pulsed laser in which excitation energy is applied to a laser plasma volume in pulses, the method comprising:
    applying plural pulses to the laser plasma volume in a series of bursts to ionize said plasma volume, each burst containing at least two pulses, said pulses being characterized in that said pulses contain energy to sustain the laser plasma, and said bursts being separated from previous burst by sufficient time for the laser plasma to relax controlling excitation of the plasma volume.

2. The method of claim 1 in which the pulses applied to the laser plasma volume are photo-initiated.

3. The method of claim 1 further comprising:
    applying a DC supply voltage across the laser plasma volume;
    and in which applying the plural pulses in a series of bursts induces switching of the DC supply voltage on and off in a series of bursts, whereby the DC supply voltage supplies the energy to sustain the laser plasma.

4. The method of claim 3 in which the pulses applied to the laser plasma volume are photo-initiated.

5. Apparatus for controlling the excitation of a laser plasma volume comprising:
    pulsed ionization means for providing pulsed ionization energy to the laser plasma volume; and
    switch means connected to the pulsed ionization means for repetitively switching the pulsed ionization means on and off to form bursts of pulses, each burst containing at least two pulses, said bursts being characterized by containing sufficient pulses to sustain the laser plasma and by being separated from the previous burst by sufficient time for the laser plasma to relax.

6. The apparatus of claim 5 further comprising:
    means for applying a DC voltage across the laser plasma volume, the energy in the series of bursts for sustaining the laser plasma being supplied by induced pulsation of the DC voltage.

7. The apparatus of claim 6 in which the pulsed ionization means includes a fluid-ballasted p-i-n electrode structure and means for supplying pulsed electrical energy to the fluid-ballasted p-i-n electrode structure.

8. A method of exciting a non-self sustained laser in which the excitation is applied to a laser plasma volume in pulses, the method comprising:
    applying a DC voltage across the laser plasma volume; and
    applying ionization pulses to the laser plasma volume in a series of bursts to ionize the laser plasma volume, whereby the DC voltage becomes pulsed in a series of bursts of DC sourced pulses;
    each burst of DC sourced pulses containing at least two pulses, said DC source pulses being characterized in that said DC sourced pulses contain sufficient energy to sustain the laser plasma, and each burst of DC pulses being separated from previous burst of DC sourced pulses by sufficient time for the laser plasma to relax, thereby controlling excitation and enhancing the stability of the plasma volume.

* * * * *